(12) United States Patent
Kakinada et al.

(10) Patent No.: US 9,198,046 B2
(45) Date of Patent: Nov. 24, 2015

(54) ENHANCED METRICS EXCHANGE FOR A WIRELESS NETWORK

(71) Applicant: Nokia Siemens Networks Oy, Espoo (FI)

(72) Inventors: Umamaheswar Kakinada, Carpentersville, IL (US); Anand S. Bedekar, Arlington Heights, IL (US); Vishnu Ram Omanakutty Amma Vijayaraghavan Nair, Bangalore (IN)

(73) Assignee: Nokia Solutions and Networks Oy, Espoo (FI)

( * ) Notice: Subject to any disclaimer, the term of this patent is extended or adjusted under 35 U.S.C. 154(b) by 227 days.

(21) Appl. No.: 13/632,623

(22) Filed: Oct. 1, 2012

(65) Prior Publication Data

US 2014/0094181 A1    Apr. 3, 2014

(51) Int. Cl.
*H04W 40/00* (2009.01)
*H04W 16/08* (2009.01)
*H04W 28/02* (2009.01)

(52) U.S. Cl.
CPC .......... *H04W 16/08* (2013.01); *H04W 28/0236* (2013.01)

(58) Field of Classification Search
CPC ........................... H04W 16/24; H04W 28/0236
USPC .............. 455/446, 550.1, 561, 420, 421, 500, 455/63.1, 67.13; 370/331, 332, 345, 329, 370/338, 328, 252
See application file for complete search history.

(56) References Cited

U.S. PATENT DOCUMENTS

2009/0197588 A1* 8/2009 Khandekar et al. ......... 455/422.1
2010/0322227 A1* 12/2010 Luo ............................... 370/345

(Continued)

FOREIGN PATENT DOCUMENTS

EP    2451214 A1    5/2012

OTHER PUBLICATIONS

3GPP TS 36.300 V11.3.0 (Sep. 2012) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; 3rd Generation Partnership Project (3GPP); Mobile Competence Centre; 650, Route des Lucioles; F-06921 Sophia-Antipolis Cedex; France; pp. 1-205.
Tian, et al. "An Adaptive bias Configuration Strategy for Range Extension in LTE-Advanced Heterogeneous Networks," from *Proceedings of ICCTA2011* (5 pages).

(Continued)

*Primary Examiner* — Babar Sarwar
(74) *Attorney, Agent, or Firm* — Harrington & Smith

(57) ABSTRACT

Apparatus, methods, computer program products, and software for reducing interference occurring when a capacity booster cell has a coverage area within the overlapping coverage areas of more than one coverage cell are disclosed. Essentially, weights are assigned, either by individual capacity booster cells or by zone controllers with which a plurality of capacity booster cells communicate, to coverage cells. The interfering coverage cells are ranked in accordance with the assigned weights, and the metrics to be reported to each of the interfering coverage cells are adjusted in view of the assigned weights. The adjusted metrics are then reported to each of the interfering coverage cells to influence the ABS muting pattern subsequently used by each of said interfering coverage cells. The technique of taking measurements to provide a rank-ordered list may be applied to other situations, such as loading, the utilization of various data and control channels, the mobility of the users, the throughput or spectral efficiency, the amount of spectrum available at the different cells, or even the relative number of antennas available at the different cells.

34 Claims, 6 Drawing Sheets

(56) References Cited

U.S. PATENT DOCUMENTS

2012/0263247 A1* 10/2012 Bhattad et al. ............... 375/260
2013/0021929 A1*  1/2013 Kim ............................ 370/252
2013/0303153 A1* 11/2013 Bontu et al. ................. 455/423
2014/0106769 A1*  4/2014 Bai et al. ................... 455/452.1
2014/0162662 A1*  6/2014 Nagata et al. ............... 455/444

OTHER PUBLICATIONS

Pang, et al. "Optimized Time-Domain Resource Partitioning for Enhanced Inter-Cell Interference Coordination in Heterogeneous Networks," from *IEEE Wireless Communication and Networking Conference: MAC and Cross-Layer Design* (5 pages).

* cited by examiner

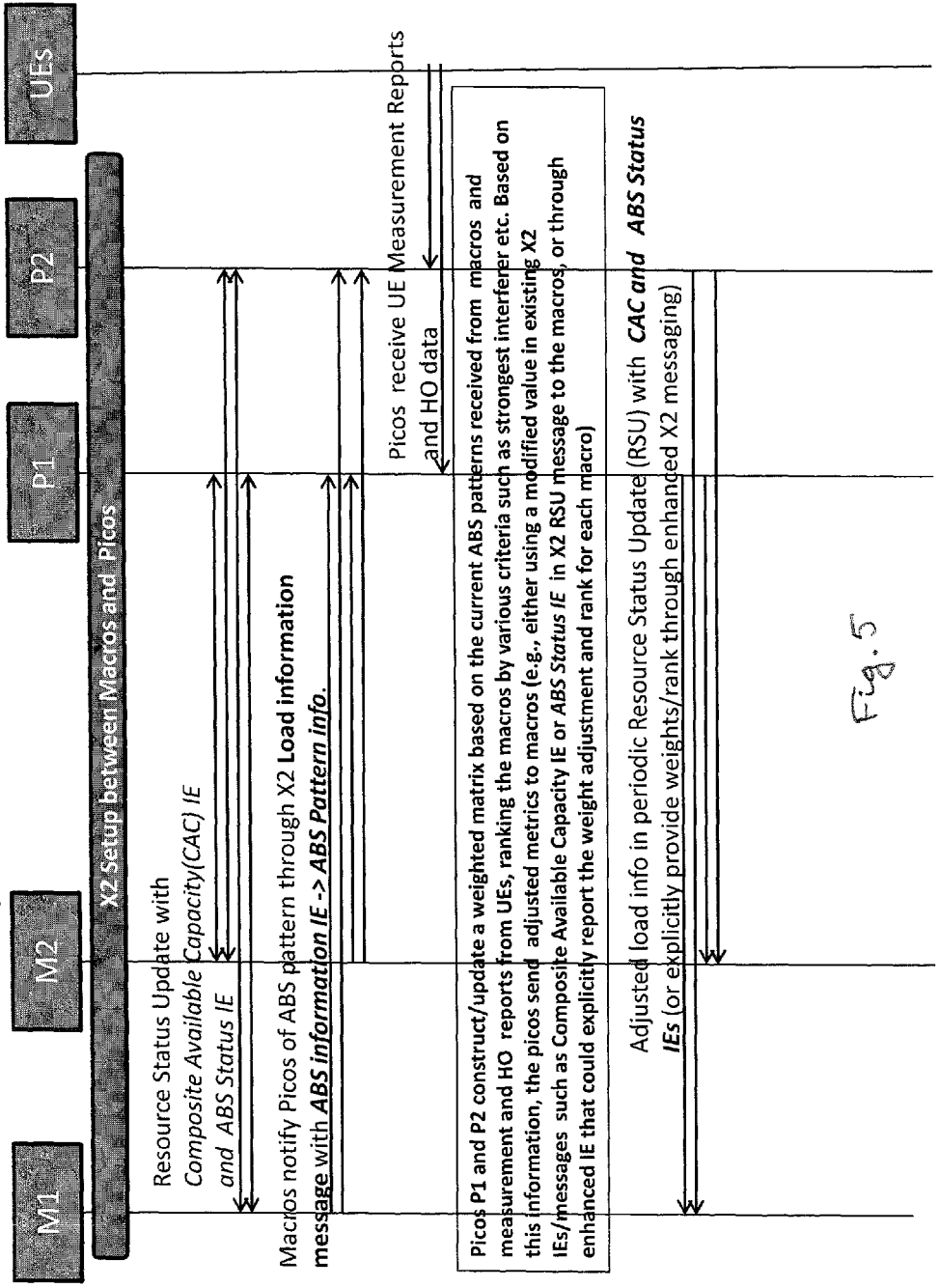

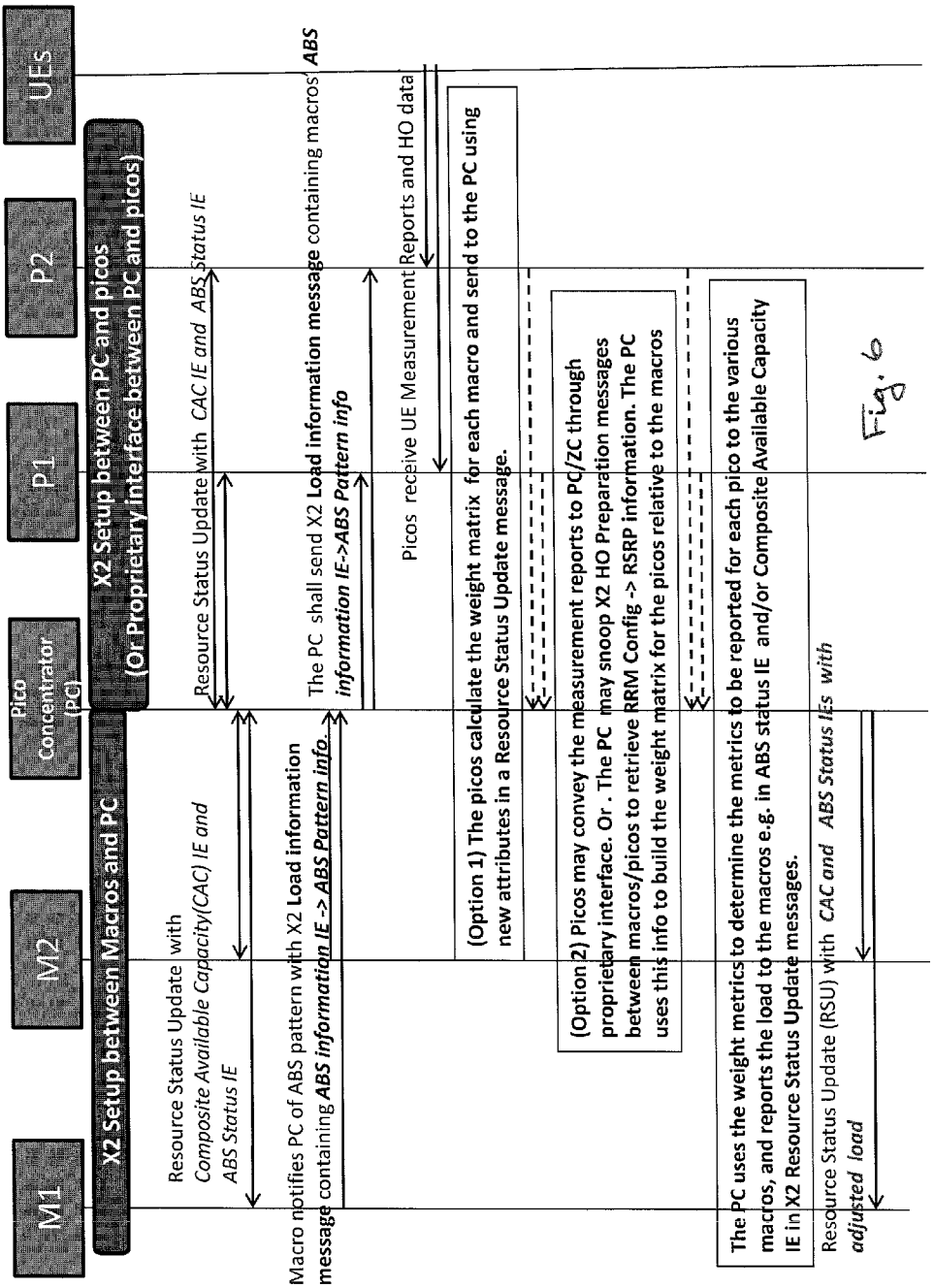

ENHANCED METRICS EXCHANGE FOR A WIRELESS NETWORK

TECHNICAL FIELD

This invention relates generally to optimization in wireless networks, one instance of which relates to the optimization of ABS muting patterns in interference situations.

BACKGROUND

This section is intended to provide a background or context to the invention disclosed below. The description herein may include concepts that could be pursued, but are not necessarily ones that have been previously conceived, implemented, or described. Therefore, unless otherwise explicitly indicated herein, what is described in this section is not prior art to the description in this application, and is not admitted to be prior art by inclusion in this section. Abbreviations that may be found in the specification and/or the drawing figures are defined below at the end of the specification, but prior to the claims.

Mobile broadband traffic continues to increase at an astounding rate. Estimates of the increase are as high as a doubling of the traffic each year for at least the next five years. Heterogeneous networks (HetNets) are being utilized more often to increase traffic capability in congested areas. In these networks, an "overlay" cell (such as a macro cell), with a higher power and a larger coverage area, is complemented with "underlay" cells (such as pico cells) having lower power and smaller coverage areas than the macro cell, but underlying some portion of the macro cell. The lower power cells reduce demands on the macro cell, while, at the same time, providing additional traffic capacity.

A common occurrence when a set of "underlay" cells (or pico cells) is deployed in the coverage area of an "overlay" cell (or macro cell) is that a given pico cell will underlie portions of more than one macro cell, and will then experience interference from more than one macro cell. In such a situation, the amount of interference experienced by the given pico cell from each of the different macro cells may differ. This variation may depend on a number of factors, such as the topology, and the number of UEs in the coverage area of a given pico cell at a given time, but the variation causes the pico cell to have different sensitivities to the ABS muting patterns adopted by different macro cells. At a given time, more ABS from one macro cell may be beneficial to the pico cell, while the pico cell may be insensitive to more ABS from another macro cell. The Almost Blank Subframes (ABS) are used for minimizing the inter-cell interference. Almost Blank Subframes are subframes with reduced transmit power (including no transmission) on some physical channels and/or reduced activity. Using this technique, some cells are muted in certain subframes, so that neighboring cells can have relatively interference-free spectrum.

SUMMARY

This section contains examples of possible implementations and is not meant to be limiting.

In summary, UEs scan for interfering macro coverage cells and report the scanned information to the serving pico cell over RRC connection between UE and serving pico cell. Additionally, the pico cell may have a capability to scan its environment and generate this information. The pico cell uses this information reported by multiple UEs, together with any information gathered from its own scanning, for further processing, such as determining the levels of interference from various other cells.

In an aspect of the invention, a method includes assigning a weight to each of two or more coverage cells by a capacity booster cell, adjusting metrics to be reported to each of the coverage cells, and reporting adjusted metrics to each of the coverage cells.

A computer program product includes a computer-readable storage medium bearing computer program code embodied therein for use with an apparatus. The computer program code includes: code for assigning a weight to each of two or more coverage cells by a capacity booster cell; code for adjusting metrics to be reported to each of the coverage cells; and code for reporting adjusted metrics to each of the coverage cells.

An apparatus is disclosed that includes: means for assigning a weight to each of two or more coverage cells by a capacity booster cell; means for adjusting metrics to be reported to each of the coverage cells; and means for reporting adjusted metrics to each of the coverage cells.

In an embodiment, the weights may be used to influence the ABS muting pattern subsequently used by each of the coverage cells, in order to provide an optimal level of interference protection to the capacity booster cell taking various factors into account. In an embodiment, the ranking of the coverage cells according to the weight may be used for a similar purpose.

In an embodiment, the calculation of the weights may be done in response to interference received by the capacity booster cell from the coverage cells. In an embodiment, the weight may also be based on measurements reported by a user device to the capacity booster or coverage cells, or based on measurements made by the capacity booster or coverage cells.

Another exemplary apparatus includes one or more processors and one or more memories including computer program code. The one or more memories and the computer program code are configured, with the one or more processors, to cause the apparatus to perform: assigning a weight to each of two or more coverage cells; adjusting metrics to be reported to each of the coverage cells; and reporting adjusted metrics to each of the coverage cells.

Another aspect of the invention includes a method including assigning a weight to each of two or more coverage cells, and reporting to each of the coverage cells at least one of the assigned weight therefor and the ranking therefor in accordance with the assigned weights.

In an embodiment, the weights may be used to influence the ABS muting pattern subsequently used by each of the coverage cells, in order to provide an optimal level of interference protection to the capacity booster cell taking various factors into account. In an embodiment, the ranking of the coverage cells according to the weight may be used for a similar purpose.

In an embodiment, the calculation of the weights may be done in response to interference received by the capacity booster cell from the coverage cells. In an embodiment, the weight may also be based on measurements reported by a user device to the capacity booster or coverage cells, or based on measurements made by the capacity booster or coverage cells.

A computer program product includes a computer-readable storage medium bearing computer program code embodied therein for use with an apparatus. The computer program code includes: code for assigning a weight to each of two or more coverage cells; and code for reporting to each of the coverage cells at least one of the assigned weight therefor and the ranking therefor in accordance with the assigned weights.

An exemplary apparatus includes: means for assigning a weight to each of two or more coverage cells; and means for reporting to each of the coverage cells at least one of the assigned weight therefor and the ranking therefor in accordance with the assigned weights.

A further exemplary apparatus includes one or more processors and one or more memories including computer program code. The one or more memories and the computer program code are configured, with the one or more processors, to cause the apparatus to perform: assigning a weight to each of two or more coverage cells; and reporting to each of the coverage cells at least one of the assigned weight therefor and the ranking therefor in accordance with the assigned weight.

In an additional aspect of the invention, a method includes: assigning a weight to each of two or more coverage cells for a capacity booster cell; forwarding to a zone controller at least one of the assigned weights and the ranking of the coverage cells in accordance with the assigned weights; adjusting metrics by the zone controller to be reported to each of the coverage cells; and relaying adjusted metrics from the zone controller to each of the coverage cells.

In an embodiment, the weights may be used to influence the ABS muting pattern subsequently used by each of the coverage cells, in order to provide an optimal level of interference protection to the capacity booster cell taking various factors into account. In an embodiment, the ranking of the coverage cells according to the weight may be used for a similar purpose.

In an embodiment, the calculation of the weights may be done in response to interference received by the capacity booster cell from the coverage cells. In an embodiment, the weight may also be based on measurements reported by a user device to the capacity booster or coverage cells, or based on measurements made by the capacity booster or coverage cells.

A computer program product includes a computer-readable storage medium bearing computer program code embodied therein for use with an apparatus. The computer program code includes: code for assigning a weight to each of two or more coverage cells for a capacity booster cell; code for forwarding to a zone controller at least one of the assigned weights and the ranking of the coverage cells in accordance with the assigned weights; code for adjusting metrics by the zone controller to be reported to each of the coverage cells; and code for relaying adjusted metrics from the zone controller to each of the coverage cells.

An exemplary apparatus includes: means for assigning a weight to each of two or more coverage cells for a capacity booster cell; means for forwarding to a zone controller at least one of the assigned weights and the ranking of the coverage cells in accordance with the assigned weights; means for adjusting metrics by the zone controller to be reported to each of the coverage cells; and means for relaying adjusted metrics from the zone controller to each of the coverage cells.

A further exemplary apparatus includes one or more processors and one or more memories including computer program code. The one or more memories and the computer program code are configured, with the one or more processors, to cause the apparatus to perform: assigning a weight to each of two or more coverage cells for a capacity booster cell; forwarding to a zone controller at least one of the assigned weights and the ranking of the coverage cells in accordance with the assigned weights; adjusting metrics by the zone controller to be reported to each of the coverage cells; and relaying adjusted metrics from the zone controller to each of the coverage cells.

In still another aspect of the invention, a method includes: in a system where messages passing between capacity booster cells and two or more coverage cells run through a zone controller, assigning a weight to each of the coverage cells for each of the capacity booster cells; adjusting metrics by the zone controller to be reported to each of the coverage cells; and relaying adjusted metrics from the zone controller to each of the coverage cells.

In an embodiment, the weights may be used to influence the ABS muting pattern subsequently used by each of the coverage cells, in order to provide an optimal level of interference protection to the capacity booster cell taking various factors into account. In an embodiment, the ranking of the coverage cells according to the weight may be used for a similar purpose.

In an embodiment, the calculation of the weights may be done in response to interference received by the capacity booster cell from the coverage cells. In an embodiment, the weight may also be based on measurements reported by a user device to the capacity booster or coverage cells, or based on measurements made by the capacity booster or coverage cells.

A computer program product includes a computer-readable storage medium bearing computer program code embodied therein for use with an apparatus. The computer program code includes: code for, in a system where messages passing between capacity booster cells and coverage cells run through a zone controller, assigning a weight to each of the coverage cells for each of the capacity booster cells; code for adjusting metrics by the zone controller to be reported to each of the coverage cells; and code for relaying adjusted metrics from the zone controller to each of the coverage cells.

An exemplary apparatus includes; means, in a system where messages passing between capacity booster cells and coverage cells run through a zone controller, for assigning a weight to each of the coverage cells for each of the capacity booster cells; means for adjusting metrics by the zone controller to be reported to each of the coverage cells; and means for relaying adjusted metrics from the zone controller to each of the coverage cells.

A further exemplary apparatus includes one or more processors and one or more memories including computer program code. The one or more memories and the computer program code are configured, with the one or more processors, to cause the apparatus to perform: in a system where messages passing between capacity booster cells and coverage cells run through a zone controller, assigning a weight to each of the coverage cells for each of the capacity booster cells; adjusting metrics by the zone controller to be reported to each of the coverage cells; and relaying adjusted metrics from the zone controller to each of the coverage cells.

It should be understood that although the aspects above may be described based on interference between the coverage cells and capacity booster cells, the usage is not limited to this. For example, factors other than interference may be used in determining how the various aspects are used, such as loading, the utilization of various data and control channels, the mobility of the users, the throughput or spectral efficiency, the amount of spectrum available at the different cells, or even the relative number of antennas available at the different cells.

BRIEF DESCRIPTION OF THE DRAWINGS

In the attached Drawing Figures:

FIG. 5 is a chart illustrating a first scenario in which the present invention may be applied.

FIG. 6 is a chart illustrating a second scenario in which the present invention may be applied.

DETAILED DESCRIPTION OF THE DRAWINGS

Figure 1:
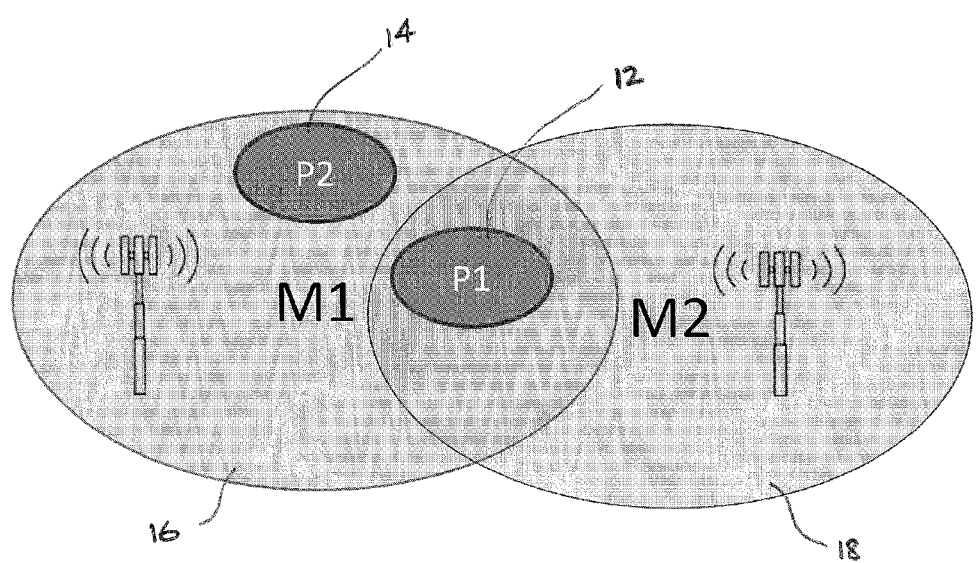
FIG. 1 is a schematic view of a pico cell experiencing interference from more than one than one macro cell.

Reference is now made to FIG. 1, which illustrates a pico cell experiencing interference from more than one than one macro cell. More specifically, pico cell (P1) 12 and pico cell (P2) 14 are deployed within the coverage area of a macro cell (M1) 16. However, pico cell (P1) 12 is also within the coverage area of a second macro cell (M2) 18. It is to be understood that both macro cell (M1) 16 and macro cell (M2) 18 are using ABS (eICIC). As a consequence, pico cell (P1) 12 is interfered with by macro cell (M1) 16 and macro cell (M2) 18, while pico cell (P2) 14 is only interfered with by macro cell (M1) 16.

When macro cell (M1) 16 determines its ABS pattern, it will take the loading and ABS usage of both pico cell (P1) 12 and pico cell (P2) 14 into account. Further, macro cell (M1) 16 will also perform range extension (RE) or HO offset for pico cell (P1) 12 and pico cell (P2) 14 to account for the loading of each. Thus, if pico cell (P1) 12 is interference-constrained or load-constrained, macro cell (M1) 16 may increase its number of ABS subframes. In addition, if pico cell (P1) 12 is load-constrained, then macro cell (M1) 16 may determine to set smaller RE toward pico cell (P1) 12.

However, pico cell (P1) 12 may be relatively insensitive to the additional ABS provided by macro cell (M1) 16 for various reasons: 1) pico cell (P1) 12 may be more strongly interfered by macro cell (M2) 18 than by macro cell (M1) 16, so that additional interference protection (ABS) provided by macro cell (M1) 16 may result in minimal benefit to pico cell (P1) 12; 2) macro cell (M2) 18 may have a tighter ABS pattern, that is, fewer ABS subframes, so that, even if macro cell (M1) 16 provides additional ABS subframes, pico cell (P1) 12 may not see an increase in the effective ABS subframes (there will be partial interference protection and somewhat better SINR in the additional ABS subframes provided by macro cell (M1) 16, but from the perspective of pico cell (P1) 12, they are not truly "almost blank"); 3) the user distribution within the coverage of pico cell (P1) 12 may be skewed toward macro cell (M2) 18, that is, most of the edge users are skewed in the region bordering macro cell (M2) 18 rather than in the region bordering macro cell (M1) 16; and 4) for similar reasons, pico cell (P1) 12 may be willing to accept more range extension toward macro cell (M1) 16 than toward macro cell (M2) 18.

Figure 2:
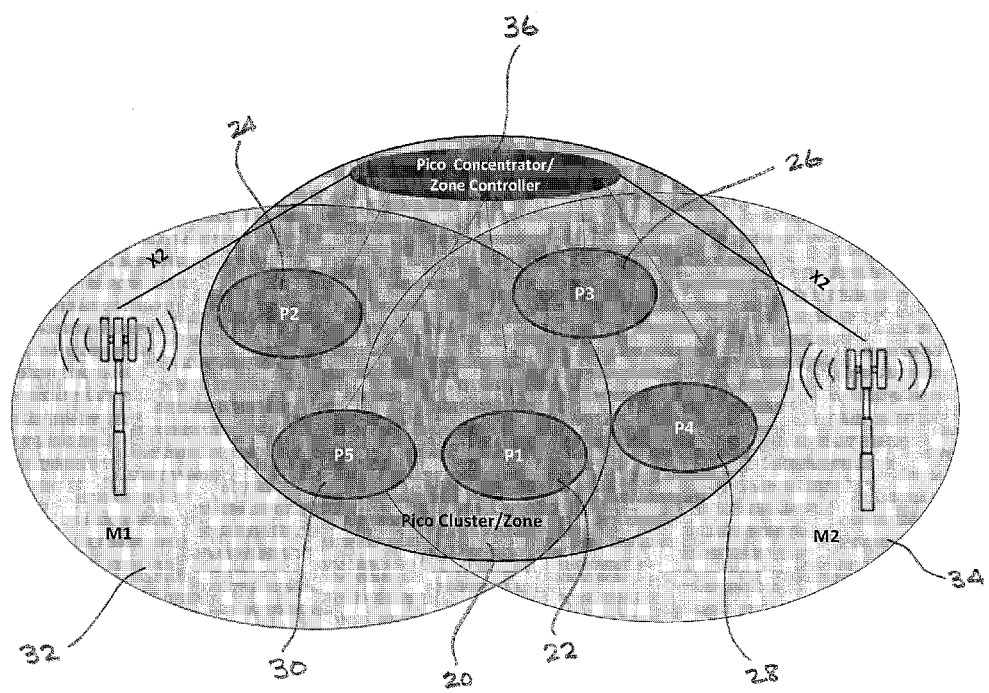
FIG. 2 is a schematic view of a pico cluster/zone having a set of pico cells deployed within the overlapping coverage areas of two macro cells.

The same problem may arise in a deployment with a pico concentrator or zone controller, as illustrated in FIG. 2, where a pico cluster/zone 20, which includes pico cell (P1) 22, pico cell (P2) 24, pico cell (P3) 26, pico cell (P4) 28, and pico cell (P5) 30, is deployed within the overlapping coverage areas of macro cell (M1) 32 and macro cell (M2) 34. Pico cluster/zone 20 includes a pico concentrator/zone controller 36. The pico concentrator/zone controller provides concentration of both signaling and user plane traffic between picos and EPC and other macros. The interface between pico concentrator/zone controller and EPC and other eNB neighbors is a standard 3GGP compliant interface, while the interface between picos and pico concentrator may or may not be a standard 3 GPP compliant interface. All X2 interactions between the pico cells and the macro cells pass through the pico concentrator/zone controller 36, so that the pico concentrator/zone controller 36 has full visibility to all the interactions between all pico cells and both macro cells, and can modify any messages as desired. It will be appreciated that the problem discussed above can arise here, because, even though there is a pico concentrator/zone controller 206, pico cell (P1) 22, pico cell (P3) 26, and pico cell (P5) 30 are, at least in part, within the coverage area of both macro cell (M1) 32 and macro cell (M2) 34.

Briefly, in accordance with the present invention, a pico cell, or pico concentrator or zone controller, as the case may be, associates a set of weights with the interfering macro cells, and orders the macro cells according to the weights. The metrics of the pico cell to be reported to the macro cell, such as load information, resource status, downlink ABS status, and composite available capacity, are modified based on the relative position of the macro cell in the ordered list of the pico cell or the value of the weight. This modification can be done by either the pico cell, or the pico concentrator or zone controller, while reporting to the macro cell, or may be made by the macro cell on receiving knowledge of the weight or the relative position.

Figure 3:
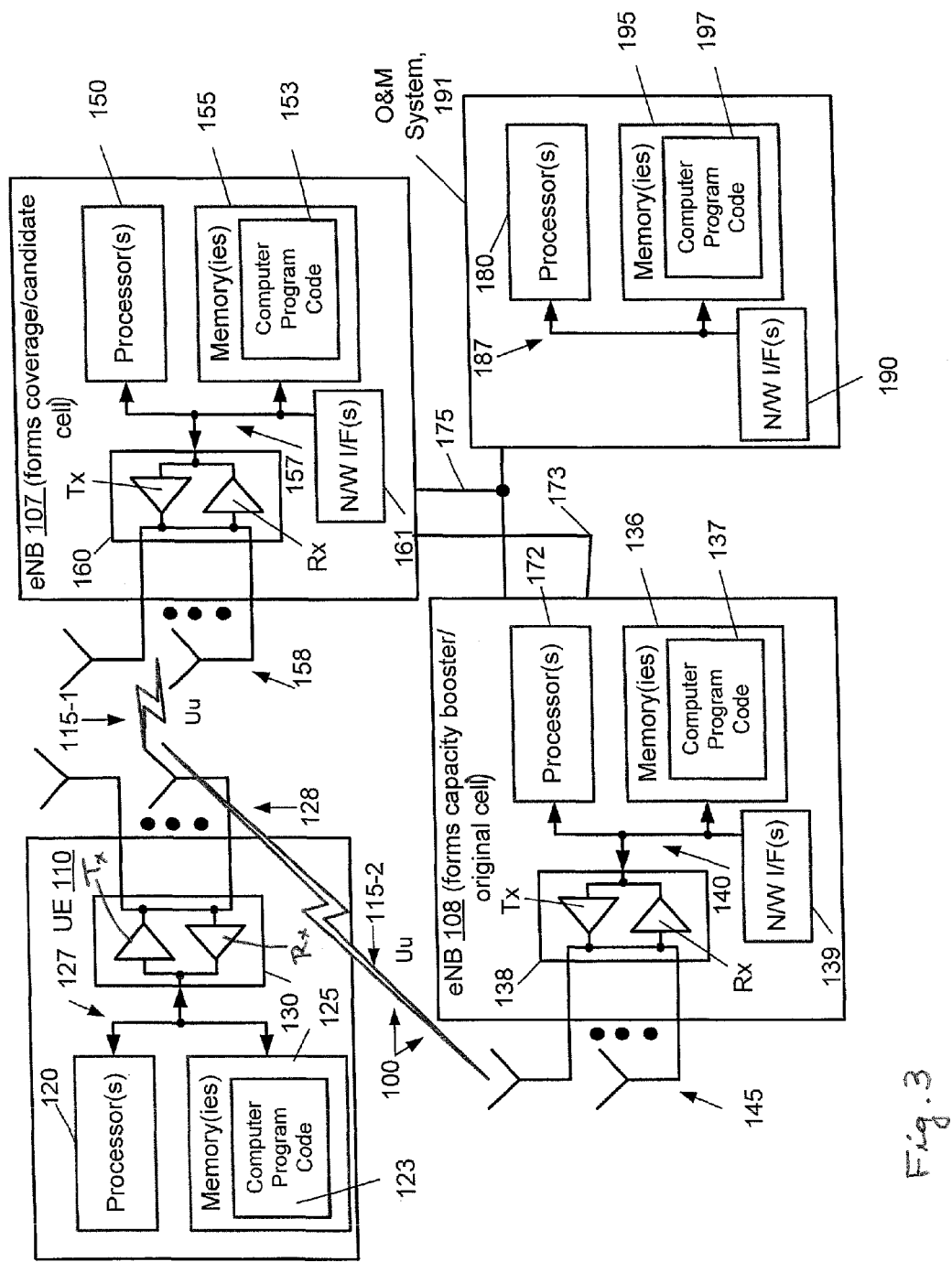
FIG. 3 illustrates an exemplary system in which the exemplary embodiments of the instant invention may be practiced.

Before proceeding with a detailed description regarding the present invention, reference is made to FIG. 3, which illustrates an exemplary system in which the exemplary embodiments of the instant invention may be practiced. In FIG. 3, a user equipment (UE) 110 is in wireless communication with a wireless network 100 via one (or both) of the wireless link 115-1 (with eNB 107) and the wireless link 115-2 (with eNB 108), where the wireless links 115-1, 115-2 can implement a Uu interface. The user equipment 110 includes one or more processors 120, one or more memories 125, and one or more transceivers 130 (each comprising a transmitter, Tx, and a receiver, Rx) interconnected through one or more buses 127. The one or more transceivers 130 are connected to one or more antennas 128. The one or more memories 125 include computer program code 123. The one or more memories 125 and the computer program code 123 are configured to, with the one or more processors 120, cause the user equipment 110 to perform one or more of the operations as described herein.

The network 100 includes eNB 107, eNB 108, and O&M system 191. In the examples presented herein, the eNB 107 forms a coverage/candidate cell, such as macro cell (M1) 16 and macro cell (M2) 18 in FIG. 1, and the eNB 108 forms a capacity booster/original cell, such as pico cell (P1) 12 and pico cell (P2) 14 in FIG. 1. It is noted that description herein indicates that "cells" perform functions, but it should be clear that the eNB that forms the cell will perform the functions. The cell makes up part of an eNB. That is, there can be multiple cells per eNB. For instance, there could be three cells for a single eNB carrier frequency and associated bandwidth, each cell covering one-third of a 360 degree area, so that the single eNB's coverage area covers an approximate oval or circle. Furthermore, each cell can correspond to a single carrier and an eNB may use multiple carriers. So, if there are three 120 degree cells per carrier and two carriers, then the eNB has a total of 6 cells. For simplicity, the coverage areas are referred to as "cells" herein, since the term "cell" is commonly used to refer to a coverage area.

It is further noted that a "capacity booster" cell is a cell having a coverage area that underlies a coverage area of a "coverage" cell. A "coverage" cell has a coverage area that overlays a coverage area of a "capacity booster" cell. As given in 3GPP TS 36.300, an energy savings "function allows, for example in a deployment where capacity boosters can be distinguished from cells providing basic coverage, to optimize energy consumption enabling the possibility for a E-UTRAN cell providing additional capacity, to be switched off when its capacity is no longer needed and to be re-activated on a need basis. The basic coverage may be provided by E-UTRAN, UTRAN or GERAN cells." The term "candidate" cell is also often used e.g., in SA5, for a coverage cell, and the term "original" cell is often used for a capacity booster cell. However, for clarity, the terms "capacity booster" and "coverage" cells as used in TS 36.300 and given above are mainly used herein.

In the examples provided herein, it is assumed the capacity booster cell is a pico cell and the coverage cell is a macro cell. The capacity booster cell may alternatively be a pico cell under the zone of a pico concentrator or zone controller. However, this is merely exemplary and the instant invention is applicable to many different types of cells, including micro cells, femto cells, relay cells and cells created by remote radio heads. Such terms as macro, pico, relay, micro, and femto commonly correspond to cell power, and therefore to corresponding coverage area.

The eNodeB 107 includes one or more processors 150, one or more memories 155, one or more network interfaces (N/W I/F(s)) 161, and one or more transceivers 160 (each comprising a transmitter, Tx, and a receiver, Rx) interconnected through one or more buses 157. The one or more transceivers 160 are connected to one or more antennas 158. The one or more memories 155 include computer program code 153. The one or more memories 155 and the computer program code 153 are configured to, with the one or more processors 150, cause the eNodeB 107 to perform one or more of the operations as described herein. The one or more network interfaces 161 communicate over networks such as the networks 173, 175.

The eNB 108 includes one or more processors 172, one or more memories 136, one or more network interfaces (N/W I/F(s)) 139, and one or more transceivers 138 (each comprising a transmitter, Tx, and a receiver, Rx) interconnected through one or more buses 140. The one or more transceivers 138 are connected to one or more antennas 145. The one or more memories 136 include computer program code 137. The one or more memories 136 and the computer program code 137 are configured to, with the one or more processors 172, cause the eNB 108 to perform one or more of the operations as described herein. The one or more network interfaces 139 communicate over networks such as the networks 173, 175.

The O&M system 191 includes one or more processors 180, one or more memories 195, and one or more network interfaces (N/W I/F(s)) 190 interconnected through one or more buses 187. The one or more memories 195 include computer program code 197. The one or more memories 195 and the computer program code 197 are configured to, with the one or more processors 180, cause the O&M system 191 to perform one or more of the operations as described herein. The one or more network interfaces 190 communicate over networks such as the networks 173, 175. Reference may be made below to a C-SON server. Such a server normally connects to O&M system 191 and for purposes here can be considered part of O&M system 191.

The eNodeB 107 and the eNode B 108 communicate with one another using, e.g., network 173. The network 173 may be wired or wireless or both and may implement, e.g., an X2 interface as specified in TS 36.423. The O&M system 191 uses the network 175 to communicate with the eNodeB 107 and eNB 108. The network 175 may be wired or wireless or both and may implement, e.g., an Itf-S. The computer readable memories 136, 155, and 195 may be of any type suitable to the local technical environment and may be implemented using any suitable data storage technology, such as semiconductor based memory devices, flash memory, magnetic memory devices and systems, optical memory devices and systems, fixed memory and removable memory. The processors 150, 172, and 180 may be of any type suitable to the local technical environment, and may include one or more of general purpose computers, special purpose computers, microprocessors, digital signal processors (DSPs) and processors based on a multi-core processor architecture, as non-limiting examples.

Turning now to a more detailed discussion of the present invention, it will be understood that the present invention is applicable to situations where a set of pico cells (P1, P2, . . . ) (or capacity booster cells) is deployed in an area overlapped by macro cells (M1, M2, . . . ) (or coverage cells). In this situation, each pico cell (P1, P2, . . . ) gets interference from one or more of the macro cells (M1, M2, . . . ) based on physical location. The pico cells (P1, P2, . . . ) report their load information to the macro cells (M1, M2, . . . ) to influence the ABS muting pattern in the macro cells (M1, M2, . . . ).

For the pico cells (P1, P2, . . . ) which receive interference from only one macro cell (M1, M2, . . . ), the reporting mechanism is simple. However, where the pico cells (P1, P2, . . . ) receive interference from two or more macro cells (M1, M2, . . . ), the present invention comprises an enhancement in the metrics reported by each pico cell to the macro cells. Specifically, the pico cell assigns a weight to each interfering macro cell based on several factors.

Firstly, topology, that is, the location of the pico cell in relation to the macro cell, is taken into account in assigning the appropriate weight. In particular, depending on how strong an interferer the macro cell is relative to other macro cells interfering with the pico cell, this information may be assembled by the pico cell over time by observing the RSRP/RSRQ reports provided by UEs and HO patterns relative to various macro cells. Higher weighting is given to stronger interferers.

Also taken into account is current ABS pattern of the macro cells relative to the ABS patterns of other interfering macro cells. Higher weighting is given to the interfering macro cells with lower numbers of current ABS subframes.

Further, the status of the UEs served by the pico cell and their location with respect to the macro cell for which the metric is being generated is also taken into account. The RSRP/RSRQ reports from UEs may provide an indication which macro may be an interferer for a given UE. Higher weighting is given to macro cells toward which the user distribution is skewed.

For example, the assigned weights can be real numbers between 0 and 1 (or equivalently, percentages between 0 and 100), with 1 (or 100%) corresponding to a macro cell which ranks the highest in all the factors mentioned above.

Figure 4:
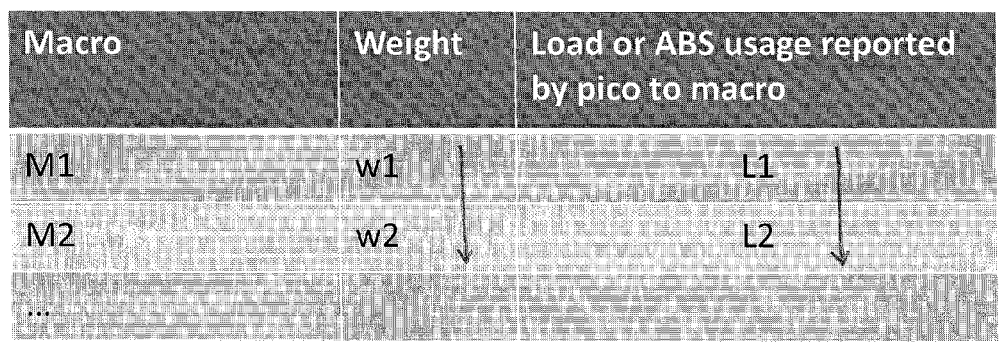
FIG. 4 is a chart illustrating the ordering of the weights and metrics reported by a pico cell to various macro cells.

Once the weights have been assigned by the pico cell, the pico cell orders or sorts the list of macro cells based on descending order of the weights, as illustrated in FIG. 4. In general, the macro cells higher up in the list (having larger weights) will correspond to the ones for which a change in their ABS is likely to make the most significant impact to the pico cell.

The pico cell then adjusts the metric (such as load metric or Composite Available Capacity and ABS status) reported to each macro cell based on the weight and relative ordering of the macro cell, for example, by reporting metric L=Actual Metric×Weight, where Weight is a number between 0 and 1. Thus, the pico cell can report higher load and higher usage of ABS to the macro cells higher up in the list, namely, the ones for which a change in their ABS is likely to make a more significant impact to the pico cell.

Scenario-1: Pico Cells have Direct X2 Connections to Macro Cells

In a first scenario, the pico cells have direct X2 connections to the macro cells, corresponding to the situation illustrated in FIG. 1. Here, the pico cells adjust the metrics to be reported to the individual macro cells based on the method described above and send it using X2, for example, by reporting a suitably modified value through Composite Available Capacity IE or ABS Status IE in an existing X2 message Resource Status Update (RSU) message, in conformity with the existing X2 spec, or by enhancing the message format to explicitly contain information about the weight and rank of a given macro cell in the ordering/matrix constructed by the pico cell.

Scenario-1 is illustrated in more complete detail in the chart shown in FIG. 5, and may be understood by reviewing the process steps shown therein from top to bottom. First, each pico cell communicates with each macro cell to exchange a Resource Status Update with Composite Available Capacity (CAC) IE and ABS Status IE. The macro cells then notify the pico cells of the ABS pattern through X2 Load Information messages with ABS information IE including ABS Pattern information. The pico cells also receive UE Measurement Reports and HO data from the UEs communicating through them.

Next, referring to the text box in FIG. 5, pico cells P1 and P2 construct or update a weighted matrix as shown in FIG. 4 based on the current ABS patterns received from the macro cells and measurement and HO reports from UEs, ranking the macro cells by various criteria, such as strongest interferer, etc., as described above. Based on this information, the pico cells send adjusted metrics to the macro cells, either using a modified value in existing X2 IEs/messages, such as Composite Available Capacity IE or ABS Status IE in X2 RSU messages to the macro cells, or through enhanced IE that could explicitly report the weight adjustment and rank for each macro cell.

Finally, the pico cells send adjusted load information in periodic Resource Status Update (RSU) with CAC and ABS Status IEs to the macro cells, or explicitly provide weights and ranking through enhanced X2 messaging to the macro cells.

Scenario-2: Pico-to Macro X2 Connections Run Through Pico Concentrator/Zone Controller In a second scenario, the pico-to-macro X2 connections run through a pico concentrator or zone controller, corresponding to the situation illustrated in FIG. 2. There are two options in this situation.

In option 1, each pico cell computes a weight matrix, as described above, for all associated macro cells and periodically sends the weight matrix to the pico concentrator or zone controller either over a proprietary interface or using new attributes in an X2 RSU message. The pico concentrator may further modify the weight matrix for a given pico cell, e.g., based on reports from other pico cells.

In option 2, the pico concentrator snoops on X2 messages passing between macro cells and pico cells, and, further, may have access to other information, such as UE measurement reports sent by UEs to pico cells, e.g., through a proprietary interface. Using such information, the pico concentrator can compute the weight matrix autonomously (i.e. without the explicit knowledge of the pico cells). The pico concentrator then determines the weight matrix for each pico cell relative to the various macro cells.

In either case, the pico concentrator determines the adjusted load/ABS usage to be reported for each pico cell to the various macro cells, and sends the adjusted metrics using X2 messages to the appropriate macro cells, for example, by reporting a suitably modified value through Composite Available Capacity IE or ABS Status IE in an existing X2 message Resource Status Update (RSU) message, in conformity with the existing X2 spec, or by enhancing the message format to explicitly contain information about the weight and rank of a given macro cell in the ordering/matrix constructed by the pico cell.

Scenario-2 is illustrated in more complete detail in the chart shown in FIG. 6, and may be understood by reviewing the process steps shown therein from top to bottom. First, the pico cells communicate with the pico concentrator (or zone controller) to exchange a Resource Status Update with Composite Available Capacity (CAC) IE and ABS Status IE. Then, the pico concentrator (or zone controller) communicates with each macro cell to exchange a Resource Status Update with Composite Available Capacity (CAC) IE and ABS Status IE.

The macro cells then notify the pico concentrator (or zone controller) of the ABS pattern through X2 Load Information messages with ABS information IE including ABS Pattern information. In turn, the pico concentrator (or zone controller) sends X2 Load Information messages with ABS information IE including ABS Pattern information of the macro cells to the pico cells. The pico cells also receive UE Measurement Reports and HO data from the UEs communicating through them.

Then, under option 1, the pico cells calculate the weight matrix for each macro cell and send the weight matrix to the pico concentrator (or zone controller) using new attributes in a Resource Status Update message. Alternatively, under option 2, the pico cells may convey the measurement reports to the pico concentrator (or zone controller) through a proprietary interface, or the pico concentrator may snoop X2 HO preparation messages between macro cells and pico cells to retrieve RRM Configuration including RSRP information. The pico concentrator (or zone controller) uses this information to build the weight matrix for the pico cells relative to the macro cells.

Under either option, the pico concentrator (or zone controller) uses the weight metrics to determine the metrics to be reported for each pico cell to the various macro cells, and reports the load to the macro cells, e.g., in ABS status IE and/or Composite Available Capacity IE in X2 Resource Status Update messages.

In either scenario, once the macro cell receives the metrics reported by each pico cell, it will use the metrics in its internal ABS adaptation algorithm.

For the case where the pico cell (or pico concentrator) has already adjusted the metrics reported to the macro cell based on the weight/ranking assigned to the macro cell, the macro cell simply runs its ABS algorithm as usual. The net effect of the modified metrics will be that the macro cell will give more importance to pico cells that are more sensitive to its interference, and will give less importance to pico cells that are less sensitive to its interference.

For the case where the pico cell (or pico concentrator) explicitly reports the weight/ranking to the macro cell, the macro cell needs to use this information in its ABS adaptation algorithm. Again, the ABS adaptation algorithm of the macro cell ensures that more importance is given to pico cells that are more sensitive to its interference, and less importance to pico cells that are less sensitive to its interference.

Similarly, when the macro cell determines the range extension towards a given pico cell, it will effectively apply a smaller range extension towards pico cells that are more sensitive to its interference, or, in general, when the macro cell is higher up in the weight/ranking list for that pico cell.

In general, the present invention provides enhanced load balancing and adaptation of ABS between macro cells and pico cells and pico concentrators (or zone controllers). Further, the present invention provides accurate information to macro cells about the effectiveness of the ABS muting pattern being adopted by the macro cells for each of the pico cells in the coverage area, as each pico cell reports an additional weight metric with respect to each interfering macro cell.

The present invention also helps the macro cell to tune its ABS muting pattern effectively to reduce wastage of resources/subframes at the macro cell due to unnecessary or excessive use of ABS towards pico cells, which would not in any way benefit from the use of ABS by that macro cell use of ABS. The present invention also promotes devoting more ABS towards pico cells where ABS is really required and effective, and providing less ABS towards pico cells where it is not effective.

The present invention also helps tune the range extension applied for a pico cell by its various interfering macro cell neighbors, and promotes higher range extension (more offload) of a pico cell towards macro cells whose interference is less sensitive for the pico cell, and smaller range extension towards macro cells whose interference is more sensitive for the pico cell. Finally, the present invention provides pico cells with a differentiating algorithm or feature for enhanced ABS performance, and can be implemented at pico concentrators or zone controllers to provide differentiated performance even with pico cells which cannot discriminate among macro cells.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 3. A computer-readable medium may comprise a computer-readable storage medium (e.g., memory 136, 155, 195 or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP Third Generation Partnership Project
ABS Almost Blank Subframe
CAC Composite Available Capacity
EDGE Enhanced Data rates for GSM Evolution
eNB or eNode B evolved Node B (LTE base station)
eICIC enhanced Inter-Cell Interference Coordination
EPC Evolved Packet Core
E-UTRAN Evolved Universal Terrestrial Radio Access Network
GERAN GSM EDGE Radio Access Network
GSM Global System for Mobile communications
HetNet Heterogeneous Network
HO Hand Over or Hand Off
IE Information Element
LTE Long Term Evolution
O&M Operation and Maintenance
PC Pico Concentrator
RE Range Extension
Rx or RX receiving or receiver
RRC Radio Resource Control
RRM Radio Resource Management
RSRP Reference Signal Received Power
RSRQ Reference Signal Received Quality
RSU Resource Status Update
SINR Signal to Interference Noise Ratio
SON Self Optimizing Network
Tx or TX transmitting or transmitter
UE User Equipment
UTRAN Universal Terrestrial Radio Access Network
Uu LTE air interface
ZC Zone Controller

What is claimed is:

1. A method comprising:
measuring a factor affecting the optimization of a wireless network, said factor being related to each of two or more coverage cells;
assigning a weight related to the factor to each of said coverage cells, said coverage cells being ranked in accordance with the assigned weights;
adjusting metrics to be reported to each of said coverage cells; and
reporting adjusted metrics to each of said coverage cells to enable each of said coverage cells to influence their respective ABS (almost blank subframe) muting patterns in order to address the factor.

2. An apparatus comprising:
one or more processors; and
one or more memories including computer program code, the one or more memories and the computer program code configured, with the one or more processors, to cause the apparatus to perform:
measuring a factor affecting the optimization of a wireless network, said factor being related to each of two or more coverage cells;

assigning a weight related to the factor to each of said coverage cells, said coverage cells being ranked in accordance with the assigned weights;

adjusting metrics to be reported to each of said coverage cells; and reporting adjusted metrics to each of said coverage cells to enable each of said coverage cells to influence their respective ABS muting patterns in order to address the factor.

3. The apparatus of claim 2, wherein said adjusted metrics are used to influence the ABS muting pattern subsequently used by at least one of said coverage cells.

4. The apparatus of claim 2, wherein said weight is based at least in part on the interference received by a given capacity booster cell from each of said interfering coverage cells.

5. The apparatus of claim 2, wherein said weight is based at least in part on a current ABS pattern of each of said coverage cells relative to current ABS patterns of the other coverage cells.

6. The apparatus of claim 2, wherein said weight is based at least in part on measurements relating to the coverage cells reported by user equipments served by a given capacity booster cell or coverage cell.

7. The apparatus of claim 2, further comprising multiplying the actual metric by the weight to obtain the adjusted metric.

8. A computer program product comprising a non-transitory computer-readable storage medium bearing computer program code embodied therein for use with an apparatus, the computer program code comprising code for performing the method of claim 1.

9. A method comprising:
measuring a factor affecting the optimization of a wireless network, said factor being related to each of two or more coverage cells;

assigning a weight related to the factor to each of said coverage cells; and reporting to each of said coverage cells at least one of the assigned weight for that coverage cell and the ranking of that coverage cell in accordance with the assigned weights to enable each of said coverage cells to influence their respective ABS muting patterns in order to address the factor.

10. An apparatus comprising:
one or more processors; and
one or more memories including computer program code, the one or more memories and the computer program code configured, with the one or more processors, to cause the apparatus to perform:

measuring a factor affecting the optimization of a wireless network, said factor being related to each of two or more coverage cells;

assigning a weight related to the factor to each of said coverage cells; and reporting to each of said coverage cells at least one of the assigned weight for that coverage cell and the ranking of that coverage cell in accordance with the assigned weights to enable each of said coverage cells to influence their respective ABS muting patterns in order to address the factor.

11. The apparatus of claim 10, wherein said at least one of the assigned rank and the ranking is used to influence the ABS muting pattern subsequently used by at least one of said coverage cells.

12. The apparatus of claim 10, wherein said weight is based at least in part on the interference received by a given capacity booster cell from each of said coverage cells.

13. The apparatus of claim 10, wherein said weight is based at least in part on a current ABS pattern of each of said coverage cells relative to current ABS patterns of the other coverage cells.

14. The apparatus of claim 10, wherein said weight is based at least in part on measurements relating to the coverage cells reported by user equipments served by a given capacity booster cell or coverage cell.

15. A computer program product comprising a non-transitory computer-readable storage medium bearing computer program code embodied therein for use with an apparatus, the computer program code comprising code for performing the method of claim 9.

16. A method comprising:
receiving at least one of assigned weights for each of two or more coverage cells and the ranking of said coverage cells in accordance with the assigned weights, the assigned weights being related to a factor affecting the optimization of a wireless network, the factor being measured by a capacity booster cell for each of said coverage cells;

adjusting metrics to be reported to each of said coverage cells; and relaying adjusted metrics to each of said coverage cells to enable each of said coverage cells to influence their respective ABS muting patterns in order to address the factor.

17. An apparatus comprising:
one or more processors; and
one or more memories including computer program code, the one or more memories and the computer program code configured, with the one or more processors, to cause the apparatus to perform:

receiving at least one of assigned weights for each of two or more coverage cells and the ranking of said coverage cells in accordance with the assigned weights, the assigned weights being related to a factor affecting the optimization of a wireless network, the factor being measured by a capacity booster cell for each of said coverage cells;

adjusting metrics to be reported to each of said coverage cells; and relaying adjusted metrics to each of said coverage cells to enable each of said coverage cells to influence their respective ABS muting patterns in order to address the factor.

18. The apparatus of claim 17, wherein said adjusted metrics reported by said zone controller are based on measurement reports or other information received from a capacity booster cell, or are based on operator-configurable parameters.

19. The apparatus of claim 17, wherein said at least one of the assigned weight and the ranking is used to influence the ABS muting pattern subsequently used by at least one of said coverage cells.

20. The apparatus of claim 17, further comprising adjusting metrics to be reported to each of said coverage cells by said zone controller in view of reports forwarded to said zone controller by other capacity booster cells.

21. The apparatus of claim 17, wherein said weight is based at least in part on interference received by a given capacity booster cell from each of said coverage cells.

22. The apparatus of claim 17, wherein said weight is based at least in part on a current ABS pattern of each of said coverage cells relative to current ABS patterns of the other coverage cells.

23. The apparatus of claim 17, wherein said weight is based at least in part on measurements relating to the coverage cells reported by user equipments served by a given capacity booster cell or coverage cell.

24. The apparatus of claim 17, further comprising multiplying the actual metric by the weight to obtain the adjusted metric to be reported to each of said coverage cells.

25. A computer program product comprising a non-transitory computer-readable storage medium bearing computer program code embodied therein for use with an apparatus, the computer program code comprising code for performing the method of claim 16.

26. A method comprising:
   monitoring messages passing between capacity booster cells and two or more coverage cells, said messages indicating a measured factor affecting the optimization of a wireless network received from each of said coverage cells by said capacity booster cells;
   assigning a weight related to the measured factor to each of said coverage cells for each of said capacity booster cells, said coverage cells being ranked in accordance with the assigned weights;
   adjusting metrics to be reported to each of said coverage cells; and
   relaying adjusted metrics to each of said coverage cells to enable each of said coverage cells to influence their respective ABS muting patterns in order to address the measured factor.

27. An apparatus comprising:
   one or more processors; and
   one or more memories including computer program code, the one or more memories and the computer program code configured, with the one or more processors, to cause the apparatus to perform:
   monitoring messages passing between capacity booster cells and two or more coverage cells, said messages indicating a measured factor affecting the optimization of a wireless network received from each of said coverage cells by said capacity booster cells;
   assigning a weight related to the measured factor to each of said coverage cells for each of said capacity booster cells, said coverage cells being ranked in accordance with the assigned weights;
   adjusting metrics to be reported to each of said coverage cells; and
   relaying adjusted metrics to each of said coverage cells to enable each of said coverage cells to influence their respective ABS muting patterns in order to address the measured factor.

28. The apparatus of claim 27, wherein messages passing between said capacity booster cells and said two or more coverage cells are messages conforming to the X2 interface.

29. The apparatus of claim 27, wherein said adjusted metrics are used to influence the ABS muting pattern subsequently used by at least one of said coverage cells.

30. The apparatus of claim 27, wherein said weight is based at least in part on interference received by a given capacity booster cell from each of said coverage cells.

31. The apparatus of claim 27, wherein said weight is based at least in part on a current ABS pattern of each of said coverage cells relative to current ABS patterns of the other coverage cells.

32. The apparatus of claim 27, wherein said weight is based at least in part on measurements relating to the coverage cells reported by user equipments served by a given capacity booster cell or coverage cell.

33. The apparatus of claim 27, further comprising multiplying the actual metric by the weight to obtain the adjusted metric to be reported to each of said coverage cells.

34. A computer program product comprising a non-transitory computer-readable storage medium bearing computer program code embodied therein for use with an apparatus, the computer program code comprising code for performing the method of claim 26.

* * * * *